United States Patent
Jones et al.

(10) Patent No.: US 10,559,805 B2
(45) Date of Patent: Feb. 11, 2020

(54) BATTERY FOR AN ELECTRIC VEHICLE

(71) Applicant: GM GLOBAL TECHNOLOGY OPERATIONS LLC, Detroit, MI (US)

(72) Inventors: Caleb Jones, Troy, MI (US); Chih-cheng Hsu, Bloomfield Township, MI (US); Charles Hua, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 15/421,654

(22) Filed: Feb. 1, 2017

(65) Prior Publication Data

US 2018/0219203 A1     Aug. 2, 2018

(51) Int. Cl.
*H01M 2/20* (2006.01)
*H01M 10/647* (2014.01)
*H01M 10/6551* (2014.01)
*H01M 10/613* (2014.01)
*B60L 50/64* (2019.01)
*H01M 2/10* (2006.01)
*H01M 2/26* (2006.01)
*B60L 58/10* (2019.01)

(52) U.S. Cl.
CPC ............ *H01M 2/206* (2013.01); *B60L 50/64* (2019.02); *H01M 2/1077* (2013.01); *H01M 2/26* (2013.01); *H01M 10/613* (2015.04); *H01M 10/647* (2015.04); *H01M 10/6551* (2015.04); *B60L 58/10* (2019.02); *B60Y 2200/91* (2013.01); *H01M 2220/20* (2013.01); *Y02T 10/7005* (2013.01)

(58) Field of Classification Search
CPC .................. H01M 2/1077; H01M 10/6553
See application file for complete search history.

(56) References Cited

U.S. PATENT DOCUMENTS

| | | |
|---|---|---|
| 9,118,069 B2 | 8/2015 | McLaughlin et al. |
| 2010/0015519 A1 | 1/2010 | Trester et al. |
| 2015/0180012 A1* | 6/2015 | Hoshino ............... H01M 2/204 429/121 |
| 2016/0133906 A1 | 5/2016 | Kedir et al. |
| 2016/0190663 A1 | 6/2016 | Bahrami et al. |

* cited by examiner

*Primary Examiner* — Ladan Mohaddes
(74) *Attorney, Agent, or Firm* — Quinn IP Law

(57) ABSTRACT

A battery for an electric vehicle includes first and second pairs of modules in electrical communication with each other. The first pair of modules includes a first module and a second module. The second module is in electrical and thermal communication with the first module via a first plurality of outer bus bars. The second pair of modules includes a third module and a fourth module. The fourth module is in electrical and thermal communication with the third module via a second plurality of outer bus bars. The first and second pairs of modules are coupled to each other via a first inner connecting bus bar and a second inner connecting bus bar proximate to a center region of each of the second and third modules.

18 Claims, 5 Drawing Sheets

BATTERY FOR AN ELECTRIC VEHICLE

TECHNICAL FIELD

The present disclosure relates to lithium ion batteries for electric vehicles, and in particular, a lithium ion battery having an improved buss bar arrangement with improved thermal management performance.

BACKGROUND

Hybrid electric vehicles (HEVs) and fully electric vehicles (EVs) are emerging as promising solutions for near-term sustainable transportation. The deleterious effects of conventional internal combustion engines (ICEs) on the environment, and certain economic issues associated with petroleum-based fuels are the major motivations in development of electric powertrains.

While EVs completely rely on the power supply from an electrochemical storage system (e.g., batteries), in HEVs a combination of ICE power and battery system power provides the propulsion in the hybrid drivetrain. Addition of a regeneration system to the vehicle allows recharging the batteries by capturing the kinetic energy during braking. Moreover, a small ICE can be used as a generator in EVs to recharge the batteries and extend the driving range.

Hybrid and fully electric vehicles have many hurdles to overcome when it comes to safety and efficiency concerns. Despite technological achievements in battery technology, large-scale application of high-energy and high-power batteries has not reached to its full potential. This shortcoming is associated with the fact that charge intake, power delivery characteristics, and calendar life of batteries strongly depends on their temperature. It is a well-evidenced fact that excessive heating of batteries during operation (charging and discharging) leads to imbalanced reactions, which consequently trigger serious safety issues such as fire and explosion. Moreover, exposure of batteries to sub-freezing temperatures drastically reduces their power delivery. Accordingly, battery thermal management system (BTMS) is a must for all large- and medium-scale battery packs to keep their temperature within an optimal range regardless of the load on the battery pack.

Lithium-ion (Li-ion) batteries have become the dominant battery technology due to several compelling features such as high power and energy densities, long cycle life, excellent storage capabilities, and memory-free recharge characteristics. Prismatic Li-ion cells, also known as pouch-shaped cells, are well known in the art, and are favored in automobiles electrification owing to the negligible weight for the case (pouch), relatively low manufacturing costs, and flexibility in shape design.

Lithium based batteries are room temperature batteries; this means that their ideal operating temperature is around 25° C. Nonetheless, they can operate within the range of −20° C. to 60° C., but at temperatures below 0° C. their capacity fades rapidly and at temperatures above 50° C. they become prone to serious thermal hazards. Accordingly, thermal management of Li-ion batteries is critical to promote their safety and performance.

In general, complexity of a BTMS increases with the size of a battery system. Significant temperature variations can occur between individual cells, as the size of battery system increases. If one cell is at a higher temperature compared to the other cells, its electrical performance will be different, and this leads to imbalance performance of the whole battery pack. Thus, to promote the peak performance, the differential temperature between the cells in the battery pack should be minimized; meanwhile the entire battery pack must be kept within a desired temperature range.

Multiple cell batteries, especially Lithium-ion (Li-ion) batteries are widely used due to its high energy density, high specific energy, long life cycle and flexible and lightweight design. Generally a multiple cell lithium-ion battery includes a battery case and a set of cells grouped in the battery case as battery modules. Each of these battery cells includes a positive electrode having a positive lead and a negative electrode having a negative lead. In construction these positive leads and negative leads are connected in series or in parallel, or in combination to meet different requirements of voltage and energy on battery level.

Normally a battery includes a bus bar, which is a metallic conductor having low impedance and high current carrying capacity and connects electrodes in the required arrangement. The bus bar is generally used as a conductor to distribute electric power to several points of the battery and the bus bar is generally used to connect electrodes of each battery cell where the bus bar connects the cells in series wherein the bus bar connects the positive terminal of one battery cell to a negative terminal of another battery cell. The bus bar is generally welded to each electrode terminal. Alternatively, bus bars may be connected to the electrode terminals by mechanical fasteners. Accordingly, the bus bars are used to carry substantial electric currents between cells over relatively short distances;

An example a traditional prior art bus bar arrangement for a lithium ion battery pack is shown in FIGS. 1A and 1B. As is known in the art, electrical transfer is the main purpose of the bus bars. However, as the length of a bus bar may become relatively long (as shown in FIGS. 1A and 1B), the temperature of the bus bar may increase as electricity travels through the bus bar. Accordingly, in conducting electrical currents between the battery cells, heat 174 may, but not necessarily, transfer from the center region 114 of each bus bar 112 (where heat accumulates between the cells) toward the end regions 116 of each bus bar 112 where the bus bar 112 is coupled to a cooling fin (not shown) via cell components. The end regions 116 of each bus bar may be affixed to each cell tab (electrode) so that the heat could be transferred from the cell cap 164 to the cell tab then to the cell and to a cooling fin which allows heat to be dissipated. It is understood that cables 120 may connect the battery pack to the vehicle.

However, given the rather long z-shaped bus bars, relatively high temperatures are generated as current travels through the bus bars 112. Moreover, it is difficult for the heat 174 to transfer from the bus bars 112 to the cooling fins given the rather long distance between the center of the z-shaped bus bars and the cooling fins.

Accordingly, there is a need for an improved bus bar arrangement for a lithium ion vehicle battery which better manages thermal energy.

SUMMARY

The present disclosure provides for a lithium battery and flexible battery module which may be used in an electric vehicle having improved heat management characteristics. The battery includes first and second pairs of modules in electrical communication with each other. The first pair of modules includes a first module and a second module. The second module is in electrical and thermal communication with the first module via a first plurality of outer bus bars. The second pair of modules includes a third module and a fourth module. The fourth module is in electrical and thermal communication with the third module via a second plurality of outer bus bars. The first and second pairs of modules are coupled to each other via a first inner connecting bus bar and a second inner connecting bus bar proximate to a center region of each of the second and third modules.

The present disclosure also provides a battery module for a vehicle battery wherein a single battery module design may be used across the different modules in a battery pack thereby simplifying the assembly process and reducing the cost for parts. The interchangeable battery module includes the module having a plurality of cells, first and second outer bus bars, and first and second inner bus bars. The module includes a center region, first and second lateral sides, and first and seconds. The interchangeable battery module further includes first and second outer bus bars in addition to first and second inner bus bars. The first outer bus bar is disposed proximate to the first lateral side of the module. The second outer bus bar is disposed proximate to the second lateral side of the module. The first outer bus bar is operatively configured to couple to a first outer connecting bus bar and the second outer bus bar is operatively configured to couple to a second outer connecting bus bar. The first inner bus bar and a second inner bus bar disposed are proximate to the center region. The first and second inner bus bars each have a proximate end and a distal end wherein the proximate end is affixed to a corresponding cell tab.

The first inner bus bar is operatively configured to be electrically coupled to an adjacent module via a first inner connecting bus bar and the second inner bus bar is configured to be electrically coupled to the adjacent module via a second inner connecting bus bar. Alternatively, the first inner bus bar is coupled to the second inner bus bar via an end connecting bus bar. It is understood that the first and second outer bus bars are operatively configured to generate electromagnetic fields which cancel each other. Each of the first and second outer bus bars as well as each of the first and second inner bus bars define a proximate end and a distal end, each of the distal ends being affixed to a cell cap. The proximate end of the first outer bus bar is configured to be affixed to a first outer connecting bus bar. The proximate end of the second outer bus bar is configured to be affixed to a second outer connecting bus bar in order to couple the module to another module. The module further includes a plurality of battery cells having a cooling fin disposed between each battery cell in the plurality of battery cells wherein each battery cell further includes a cell tab and a corresponding cell cap. The first and second outer bus bars, the first and second inner bus bars, the corresponding cell cap, the cell tab, the battery cell and the cooling fin are in thermal communication with one another.

The thermal energy generated by the bus bars in the flexible module is distributed evenly in the module given that the first and second outer bus bars are operatively configured to thermally balance each other at each lateral side of the module.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1A:
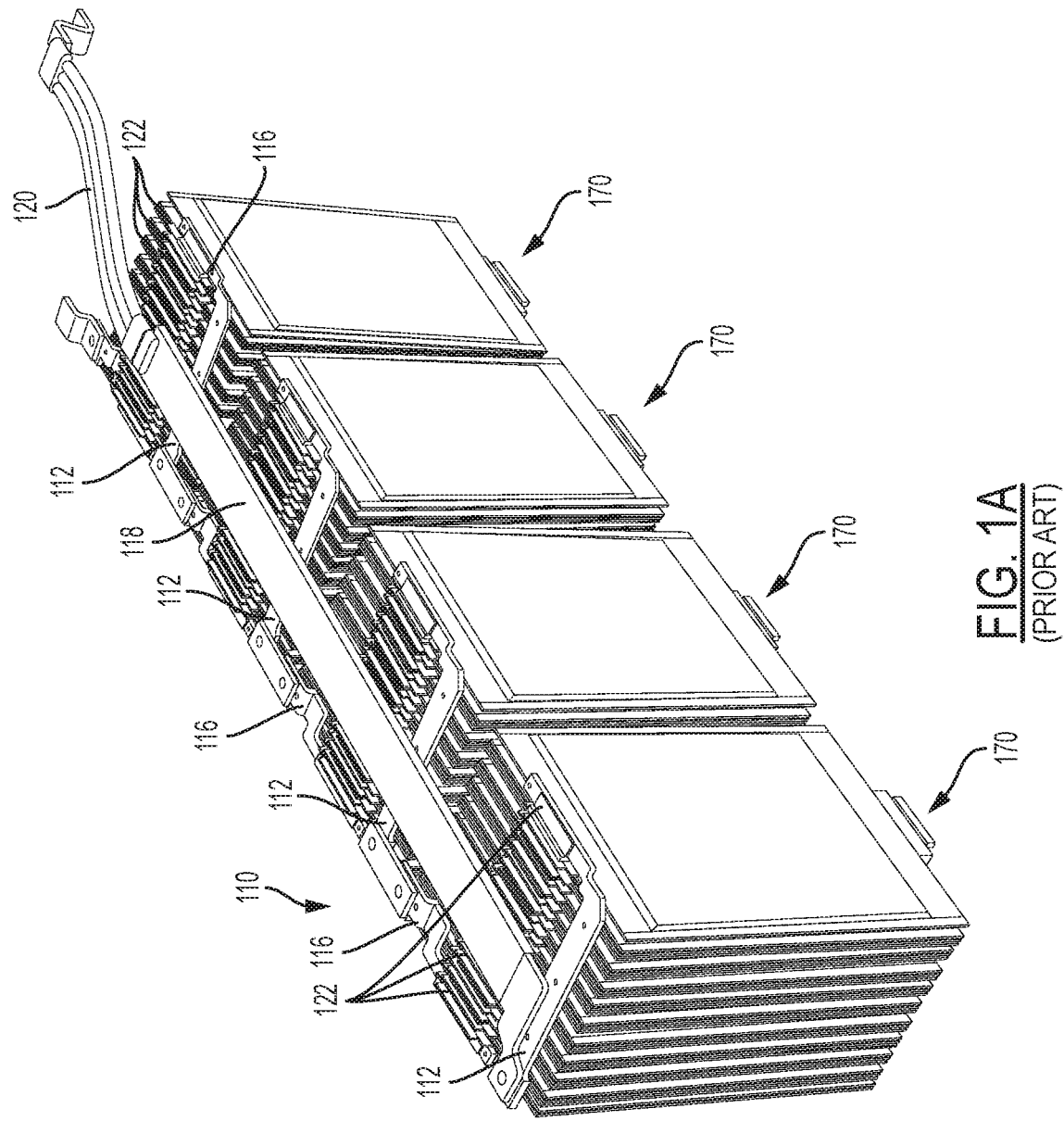
FIG. 1A is an isometric view of a traditional bus bar arrangement on a lithium ion battery for a vehicle.
Figure 1B:
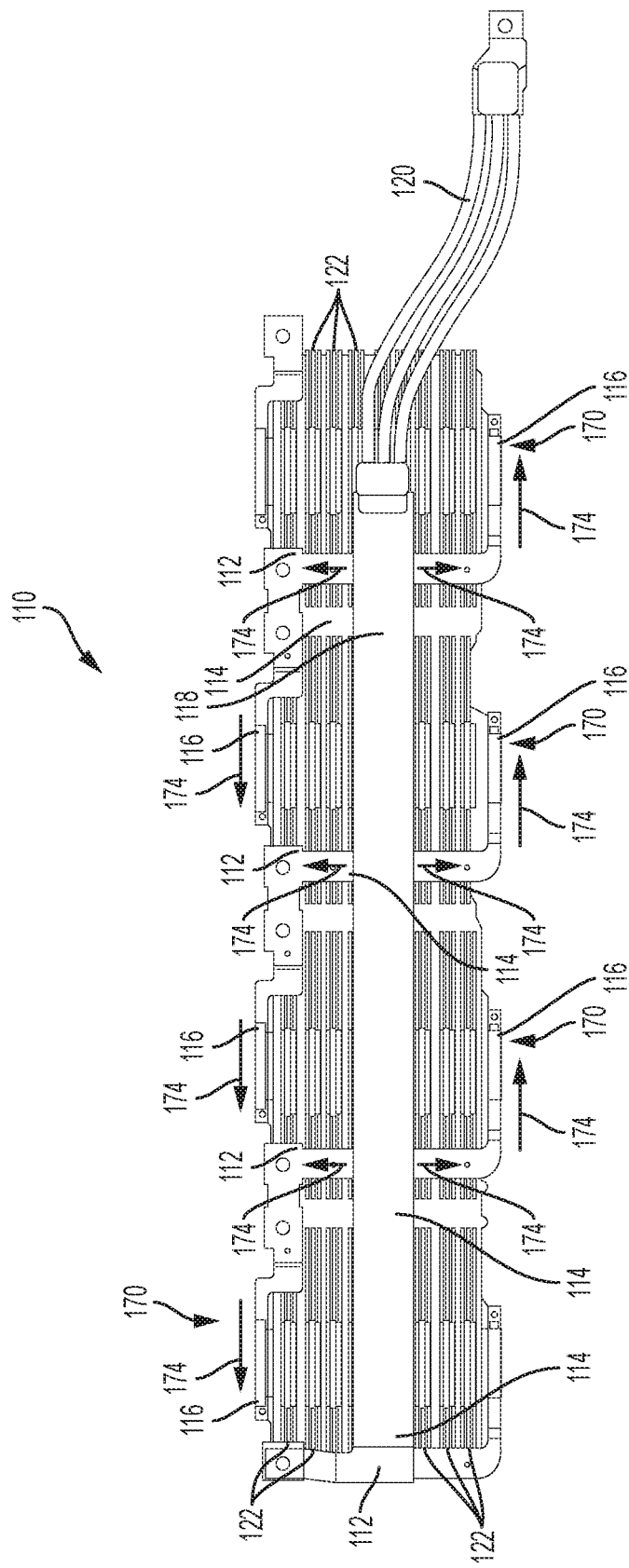
FIG. 1B is a top view of a traditional bus bar arrangement on a lithium ion battery for a vehicle.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2:
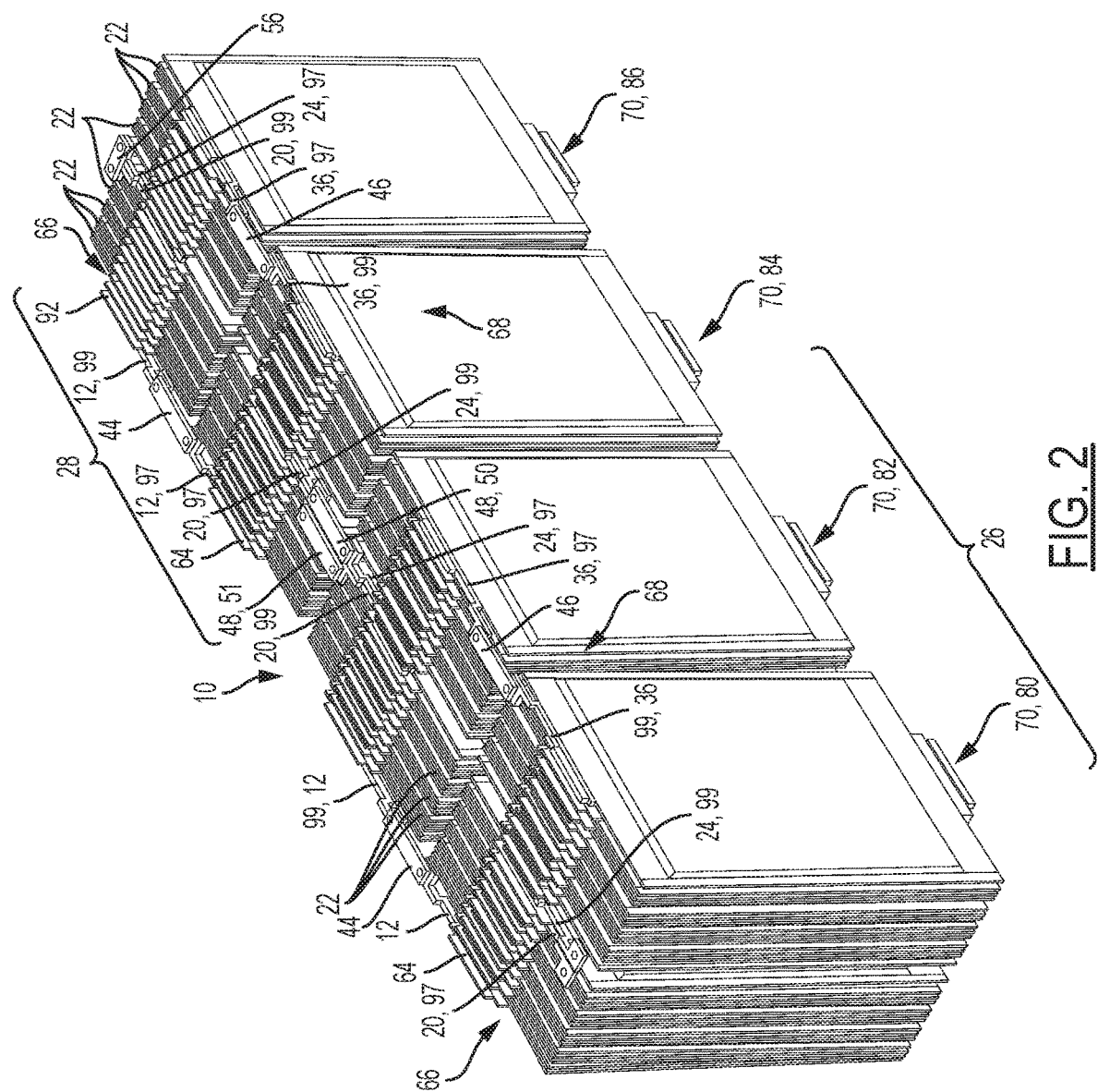
FIG. 2 is an isometric view of a bus bar arrangement in accordance with various embodiments of the present disclosure where the bus bar arrangement is implemented on a lithium ion battery for a vehicle.
Figure 3:
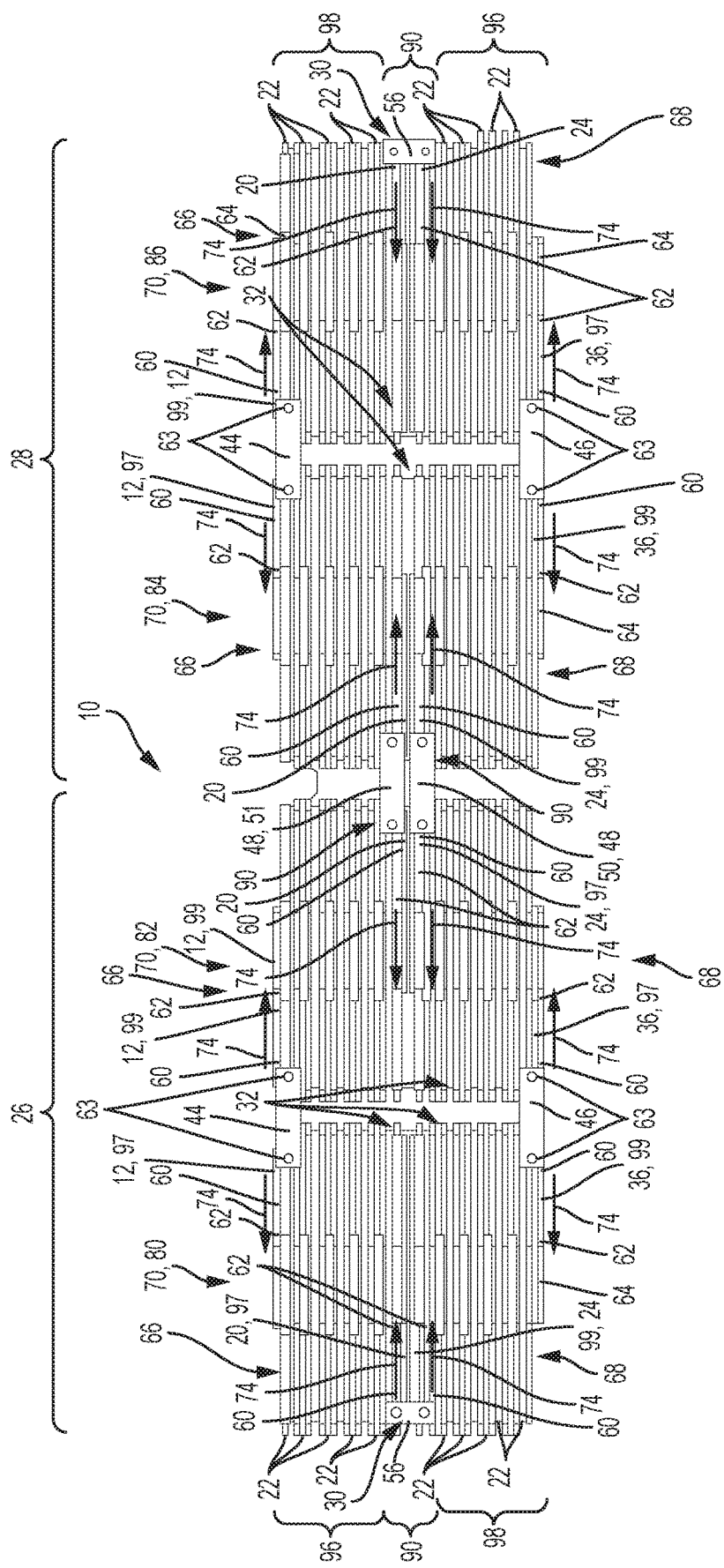
FIG. 3 is a top view of a bus bar arrangement in accordance with various embodiments of the present disclosure where the bus bar arrangement is implemented on a lithium ion battery for a vehicle.

With reference to FIGS. 2 and 3, the present disclosure provides for a lithium ion battery 10 for an electric vehicle where the bus bar arrangement better manages thermal energy throughout the vehicle. As shown in FIG. 2, a lithium ion battery 10 for an electric vehicle is shown. The lithium ion battery 10 shown in FIG. 2 includes four battery modules 70. A plurality of bus bars are provided which connect one battery module 70 to another battery module 70. A pair of outer bus bars 12, 36 are disposed on the lateral sides of each battery module 70. The first outer bus bar 12 (shown as a positive terminal 97) is disposed at the first lateral side 66 of the battery module 70 while a second outer bus bar 36 (shown as a negative terminal 99) is disposed at the second lateral side 68 of the battery module as seen in FIG. 3. The first and second outer bus bars 12, 36 (positive terminal 97 and negative terminal 99) are affixed to corresponding first and second outer connecting bus bars 44, 46 which are generally disposed between each module—first and second modules 80, 82. The first and second outer connecting bus bars 44, 46 are configured to electrically couple the first and second outer bus bars 12, 36 (positive terminal 97 and negative terminal 99) of one module to the oppositely charged terminals (negative terminal 99 and positive terminal 97) of an adjacent module 70.

Figure 4:
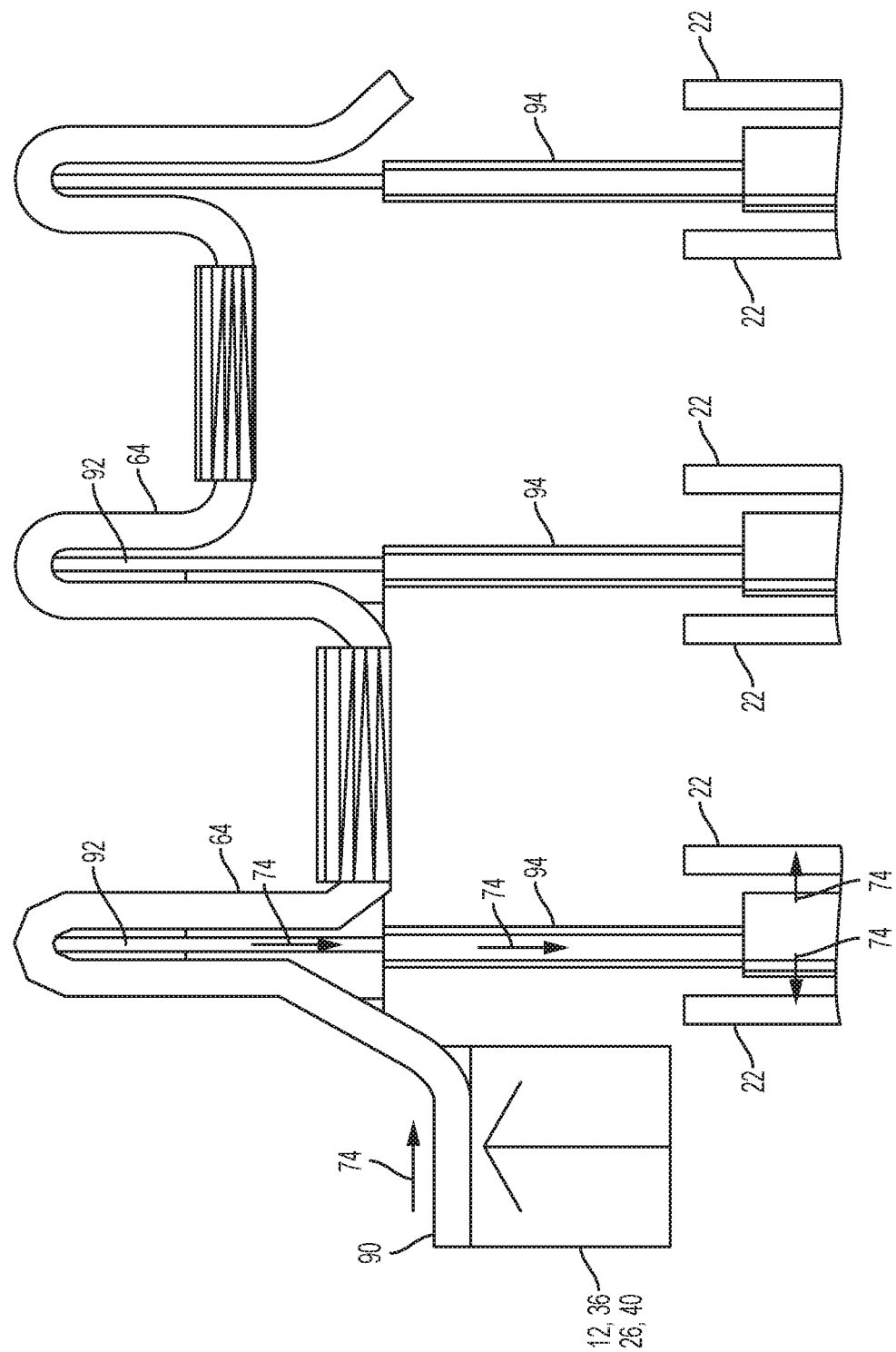
FIG. 4 is a partial cross sectional view of an outer bus bar, the cells, cell caps, and cell tabs of the battery in FIG. 2 along lines 4-4.

Therefore, in the non-limiting example of FIG. 3, first outer bus bar 12 includes a proximate end 60 and a distal end 62 where the proximate end 60 is affixed to a first outer connecting bus bar 44 while the distal end 62 is affixed to a cell cap 64 (or a cell component) proximate to the first lateral side 66 of the first module. The second outer bus bar 36 also includes a proximate end 60 and a distal end 62 where the proximate end 60 is affixed to a second outer connecting bus bar 46 while the distal end 62 of the second outer bus bar 36 is affixed to a cell cap 64 (or a cell component) proximate to the second lateral side 68 of the first module 70, 80. The proximate end 60 of the first outer bus bar 12 may, but not necessarily, be affixed to the first outer connecting bus bar 44 via a mechanical fastener 63. The proximate end 60 of the first outer bus bar 12 may also be affixed to the first outer connecting bus bar 44 via a weld as well. It is understood that the distal end 62 of the first outer bus bar 12 may, but not necessarily be welded to a cell cap 64 proximate to the first lateral side 66 as shown in FIG. 4. The heat 74 from the first outer connecting bus bar 44 and the first outer bus bar 12 may then be conveyed to the cell cap 64 to the cell tab 92 to the cell 94 and then to the cooling fins 22 which are adjacent to each cell 94.

Similarly, the proximate end 60 of the second outer bus bar may, but not necessarily, be affixed to the second outer connecting bus bar 46 via a mechanical fastener 63. The proximate end 60 of the second outer bus bar 36 may also be affixed to the second outer connecting bus bar 46 via a weld as well. It is understood that the distal end 62 of the second outer bus bar 36 may, but not necessarily be welded to a cell cap 64 proximate to the second lateral side similar to that as shown in FIG. 4. Similarly, the heat 74 from the second outer bus bar 36 may then be conveyed from the second outer bus bar 36 to the cell cap 64 to the cell tab 92 to the cell 94 and then to the cooling fins 22 which are adjacent to each cell 94.

It is understood that the first and second outer connecting bus bars 36, 46 are operatively configured to connect the first module 70, 80 to the second module 70, 82 such that electricity may be transferred from the first module 80 to the second module 82. With respect to the first outer connecting bus bar 44, the first outer connecting bus bar 44 may be operatively configured to electrically connect the positive terminal 97 (first outer bus bar 12) on the positive side 96 of the first module 80 to the negative terminal 99 (first outer bus bar 12) on the negative side 98 of the second module 82. Moreover, as shown, the corresponding outer bus bar 12 (negative terminal 99 of second module 82) is disposed proximate to the first lateral side 66 of the adjacent (second) battery module 70, 82. The corresponding outer bus bar 12 of the adjacent (second) battery module 70, 82 may also be referred to as a first outer bus bar 12 given that this bus bar 12 is disposed proximate to the first lateral side 66 of the second battery module 70, 82 as shown in FIG. 2.

With respect to the second outer connecting bus bar 46, the second outer connecting bus bar 46 may be operatively configured to electrically connect the negative terminal 99 on the negative side 98 of the first module 80 to the positive terminal 97 of the positive side 98 of the second module 82. As shown, the second outer connecting bus bar 46 couples the second outer bus bar 36 to a corresponding outer bus bar 36 of an adjacent (second) battery module 70, 82 where the corresponding outer bus bar 36 (negative terminal 99 of first module 80) is disposed proximate to the second lateral side 68 of the adjacent (second) battery module 70, 82. The corresponding outer bus bar 36 (positive terminal 97) of the adjacent (second) battery module 70, 82 may also be referred to as a second outer bus bar 36 given that this bus bar 36 is disposed proximate to the second lateral side 68 of the second battery module 70, 82 as shown in FIG. 2.

It is to be understood that the first and second outer bus bars 12, 36 of the first module are disposed proximate to the second end 32 of the first module. On the first end 30 of the first module, first and second inner bus bars 20, 24 are disposed proximate to the center region 90 of the first module as shown in FIGS. 2 and 3. Each of the first and second inner bus bars 20, 24 include a distal end 62 which is affixed to a cell cap 64 via a weld or a mechanical fastener 63 or the like. It is to be understood that heat 74 may be transferred from each of the first and second inner bus bars 20, 24 to a corresponding cell cap 64 and then to a corresponding cell tab 92 to the cell 94 and then to a cooling fin 22. The first and second bus bars may be connected to each other via an inner connecting bus bar 56. The inner connecting bus bar 56 is configured to electrically connect a positive terminal 97 (first inner bus bar 20) on the positive side 96 of the first module 80 to the negative terminal 99 (second inner bus bar 24) on the negative side 98 of the first module 80.

As shown in FIGS. 2 and 3, the second module 82 also includes first and second inner bus bars 20, 24 which are also disposed on a second end 32 of the second module 82—the second end 32 of each module 70 (for example second module 82) is opposite the first end 30 of the same module (for example second module 82). However, first and second inner bus bars 20, 24 are similarly disposed proximate to the center region 90 of the second module 82 as shown in FIGS. 2 and 3. Each of the first and second inner bus bars 20, 24 include a distal end 62 which is affixed to a cell cap 64 via a weld or a mechanical fastener 63 or the like. It is to be understood that heat 74 may be transferred from each of the first and second inner bus bars 20, 24 to a corresponding cell cap 64 and then to a corresponding cell tab 92 to the cell 94 and then to a cooling fin 22. Each of the first and second inner bus bars 20, 24 of the second module 82 may each include a proximate end where each proximate end is affixed to a corresponding inner connecting bus bar via mechanical fastener(s) or a weld or the like. Therefore, the proximate end of the first inner bus bar in the second module 82 is affixed to a first inner connecting bus bar 51 while the proximate end of the second inner bus bar 24 in the second module 82 is affixed to a second inner connecting bus bar 50. The first inner connecting bus bar 51 of the second module 82 is configured to electrically connect a negative terminal 99 (first inner bus bar 20) on negative side 98 of the second module 82 to the positive terminal 97 (first inner bus bar 20) on the positive side 96 of the third module 84. Similarly, the second inner connecting bus bar 50 of the second module 82 is configured to electrically connect a positive terminal 97 (second inner bus bar 24) on the positive side 98 of the second module 82 to the negative terminal 99 (second inner bus bar 24) on negative side 98 of the third module 84.

It is understood that the first and second modules 80, 82 form a first pair 26 of modules and the third and fourth modules 84, 86 form a second pair 28 of modules wherein the first pair and the second pair 26, 28 are electrically coupled to one another via a first inner connecting bus bar 51 and a second inner connecting bus bar 50. The first and second modules 80, 84 in the first pair 26 are electrically coupled to each other via first and second outer bus bars 12, 36. The third and fourth modules 84, 86 in the second pair 28 are also electrically coupled to each other via first and second outer bus bars 12, 36.

As shown in FIGS. 2 and 3, the third module 84 also includes first and second inner bus bars 20, 24 which are also disposed on a first end 30 of the third module 84—the second end 32 of each module is opposite the first end 30 of each module. The first and second inner bus bars 20, 24 are similarly disposed proximate to the center region 90 of the third module 84 as shown in FIGS. 2 and 3. Each of the first and second inner bus bars 20, 24 similarly include a distal end 62 which is affixed to a cell cap 64 via a weld or a mechanical fastener 63 or the like. It is to be understood that heat 74 may also be transferred from each of the first and second inner bus bars 20, 24 to a corresponding cell cap 64 and then to a corresponding cell tab 92 to the cell 94 and then to a cooling fin 22. Each of the first and second inner bus bars 20, 24 of the third module 84 may each include a proximate end where each proximate end is affixed to a corresponding inner connecting bus bar via mechanical fastener(s) or a weld or the like. Accordingly, the first inner bus bar 20 of the third module 84 is affixed to the first inner connecting bus bar 51 such that the first inner bus bar 20 of the third module 84 is electrically coupled to the first inner bus bar 20 of the second module 82. The second inner bus bar 24 (negative terminal 99) of the third module 84 is affixed to the second inner connecting bus bar 48, 50 such that the second inner bus bar 24 (negative terminal 99) of the third module 84 is electrically coupled to the second inner bus bar 24 (positive terminal 97) of the second module 82 via a second inner connecting bus bar 48, 50—thereby facilitating electrical communication between the negative and positive terminals of the second and third modules 82, 84—or between the first pair 26 of modules and the second pair 28 of modules. First and second inner connecting bus bars 51, 50 may each also be referred to as an inner connecting bus bar 48.

It is understood that the first and second outer connecting bus bars 36, 46 between the third and fourth modules 84, 86 are operatively configured to electrically connect the third module 84 to the fourth module 86 such that electricity may be transferred from the third module 84 to the fourth module 86. With respect to the first outer connecting bus bar 44, the first outer connecting bus bar 44 may be operatively configured to electrically connect the positive terminal 97 (first outer bus bar 12 of the third module 84) on the positive side 96 of the third module 84 to the negative terminal 99 (first outer bus bar 12) on negative side 98 of the fourth module 86. Moreover, the first outer connecting bus bar 44 is operatively configured to couple the first outer bus bar 12 (positive terminal 97 of third module 84) to a corresponding outer bus bar 12 (negative terminal 99) of an adjacent (fourth) battery module 86 where each first outer bus bar 12 is disposed proximate to the first lateral side 66 of each battery module 84, 86.

With respect to the second outer connecting bus bar 46, the second outer connecting bus bar 46 may be operatively configured to electrically connect the negative terminal 99 (second outer bus bar 36) on negative side 98 of the third module 84 to the positive terminal 97 (second outer bus bar 26) on the positive side 96 of the fourth module 86. As shown, the second outer connecting bus bar 46 couples the second outer bus bar 36 (negative terminal 99) of the third module 84 to a corresponding outer bus bar 36 (positive terminal 97) of an adjacent (fourth) battery module 86 where teach of the aforementioned outer bus bars 36 is disposed proximate to the second lateral side 68 of the adjacent (fourth) battery module 86. The corresponding outer bus bar 36 of the adjacent (fourth) battery module 86 may also be referred to as a second outer bus bar 36 given that this bus bar 36 is disposed proximate to the second lateral side 68 of the fourth battery module 86 as shown in FIG. 2. It is to be understood that the first and second outer bus bars 12, 36 of the fourth module 86 are disposed proximate to the second end 32 of the fourth module 86.

Similar to the first module, fourth module 86 also has first and second inner bus bars 20, 24 disposed proximate to the first end 30. On the first end 30 of the fourth module 86, first and second inner bus bars 20, 24 are disposed proximate to the center region 90 of the fourth module 86 as shown in FIGS. 2 and 3. Each of the first and second inner bus bars 20, 24 include a distal end 62 which is affixed to a cell cap 64 via a weld or a mechanical fastener 63 or the like. It is to be understood that heat 74 may be transferred from each of the first and second inner bus bars 20, 24 to a corresponding cell cap 90 and then to a corresponding cell tab 92 to the cell 94 and then to a cooling fin 22. The first and second bus bars 20, 24 of the fourth module 86 may be then be connected to each other via an inner connecting bus bar 56. The inner connecting bus bar 56 is configured to electrically connect a positive side 96 (via positive terminal 97 for second inner bus bar 24) of the fourth module to the negative side 98 (via negative terminal 99 or first inner bus bar 20) of the fourth module 86 thereby closing the electrical loop between the positive and negative sides of each module 70.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A battery module for a battery pack, the battery module comprising:
   a plurality of first battery cells and a plurality of second battery cells that define a first lateral side, a second lateral side, an additional side and a center region between the plurality of first battery cells and the plurality of second battery cells;
   a first outer bus bar disposed proximate to the first lateral side, and operatively configured to couple the plurality of first battery cells to a first outer connecting bus bar;
   a second outer bus bar disposed proximate to the second lateral side, and operatively configured to couple the plurality of second battery cells to a second outer connecting bus bar;
   a first inner bus bar disposed proximate to the center region, the first inner bus bar having a first proximate end and a first distal end, and the first proximate end is affixed to a corresponding first cell tab of the plurality of first battery cells; and
   a second inner bus bar disposed proximate to the center region, the second inner bus bar having a second proximate end and a second distal end, and the second proximate end is affixed to a corresponding second cell tab of the plurality of second battery cells.

2. The battery module as defined in claim 1 wherein:
   the first inner bus bar is operatively configured to be electrically coupled to an adjacent battery module via a first inner connecting bus bar; and
   the second inner bus bar is operatively configured to be electrically coupled to the adjacent battery module via a second inner connecting bus bar.

3. The battery module as defined in claim 1 wherein the first inner bus bar is coupled to the second inner bus bar via an inner connecting bus bar.

4. The battery module as defined in claim 1 wherein the first outer bus bar and the second outer bus bar are spatially oriented to generate electromagnetic fields which cancel each other.

5. The battery module as defined in claim 1 wherein the first inner bus bar and the second inner bus bar are spatially oriented to generate electromagnetic fields which cancel each other.

6. The battery module as defined in claim 1 wherein:
   each of the first outer bus bar, the second outer bus bar, the first inner bus bar and the second inner bus bar define a respective proximate end and a respective distal end; and
   each of the respective distal ends is affixed to a respective cell cap of the plurality of first cells and the plurality of second cells.

7. The battery module as defined in claim 6 wherein:
   the respective proximate end of the first outer bus bar is configured to be affixed to the first outer connecting bus bar; and
   the respective proximate end of the second outer bus bar is configured to be affixed to the second outer connecting bus bar.

8. The battery module as defined in claim 1 further comprising a plurality of cooling fins disposed between each battery cell in the plurality of first battery cells and the plurality of second battery cells, wherein each battery cell includes a corresponding cell tab.

9. The battery module as defined in claim 8 wherein the first outer bus bar, the second outer bus bar, the first inner bus bar, second inner bus bar, the corresponding cell tabs, the plurality of first battery cells, the plurality of second battery cells and the plurality of cooling fin are in thermal communication with one another.

10. The battery module as defined in claim 9 wherein the first outer bus bar and the second outer bus bar are operatively configured to thermally balance each other.

11. The battery module as defined in claim 10 wherein the first inner bus bar and the second inner bus bar are operatively configured to thermally balance each other.

12. A battery for an electric vehicle, the battery comprising:
   a first pair of modules having a first module and a second module being in electrical and thermal communication with the first module;
   a second pair of modules having a third module and a fourth module being in electrical and thermal communication with the third module;
   wherein the first pair of modules and the second pair of modules are coupled to each other via a first inner connecting bus bar and a second inner connecting bus bar proximate to a center region of each of the second module and the third module; and
   wherein each respective module of the first pair of modules and the second pair of modules includes:
      a plurality of first battery cells and a plurality of second battery cells that define a first lateral side, a second lateral side, an additional side and the center region between the plurality of first battery cells and the plurality of second battery cells;
      a first outer bus bar disposed proximate to the first lateral side, and operatively configured to couple the plurality of first battery cells to a first outer connecting bus bar;
      a second outer bus bar disposed proximate to the second lateral side, and operatively configured to couple the plurality of second battery cells to a second outer connecting bus bar;
      a first inner bus bar disposed proximate to the center region, the first inner bus bar having a first proximate end and a first distal end, and the first proximate end is affixed to a corresponding first cell tab of the plurality of first battery cells; and
      a second inner bus bar disposed proximate to the center region, the second inner bus bar having a second proximate end and a second distal end, and the second proximate end is affixed to a corresponding second cell tab of the plurality of second battery cells.

13. The battery as defined in claim 12 wherein:
each of the first outer bus bars are electrically coupled to each other within each pair; and
each of the second outer bus bars are electrically coupled to each other within each pair.

14. The battery as defined in claim 12 wherein each respective module further comprises a plurality of cooling fins disposed between each battery cell in the plurality of first battery cells and the plurality of second battery cells.

15. The battery as defined in claim 12 wherein the first outer bus bars and the second outer bus bars are operatively configured to thermally balance each other.

16. The battery as defined in claim 12 wherein the first inner connecting bus bars and the second inner connecting bus bars are operatively configured to thermally balance each other.

17. The battery module defined in claim 1 wherein:
the plurality of first battery cells are disposed between the first lateral side and the center region of the module; and
the plurality of second battery cells are disposed between the second lateral side and the center region of the module.

18. The battery module defined in claim 2 wherein:
a physical gap exists between the battery module and an additional adjacent battery module; and
the first outer connecting bus bar and second outer connecting bus bar bridge the physical gap and are disposed along the additional side of the battery module.

* * * * *